United States Patent [19]

Bagley et al.

[11] Patent Number: 5,497,617
[45] Date of Patent: Mar. 12, 1996

[54] GAS-ENRICHED LIGHT-OFF

[75] Inventors: Rodney D. Bagley, Big Flats; Jacqueline L. Brown; Brent M. Wedding, both of Corning, all of N.Y.

[73] Assignee: Corning Incorporated, Corning, N.Y.

[21] Appl. No.: 86,732

[22] Filed: Jul. 2, 1993

[51] Int. Cl.$^6$ ........................................................ F01N 3/20
[52] U.S. Cl. .................................. 60/274; 60/284; 60/286
[58] Field of Search ................................ 60/274, 284, 286

[56] References Cited

U.S. PATENT DOCUMENTS

| | | | |
|---|---|---|---|
| 3,020,903 | 2/1962 | Kloss | 60/284 |
| 3,911,675 | 10/1975 | Mondt | 60/284 |
| 4,007,590 | 2/1977 | Nagai | 60/284 |
| 4,211,075 | 7/1980 | Ludecke et al. | |
| 5,157,920 | 10/1992 | Nakaniwa | |
| 5,163,290 | 11/1992 | Kinnear | 60/300 |
| 5,193,340 | 3/1993 | Kamihara | |

FOREIGN PATENT DOCUMENTS

| | | |
|---|---|---|
| 0499207A1 | 8/1992 | European Pat. Off. |
| 0498598A1 | 8/1992 | European Pat. Off. |
| 2254014 | 9/1992 | United Kingdom |
| 2256603 | 12/1992 | United Kingdom |

OTHER PUBLICATIONS

*Emission Levels and Catalyst Temperatures as a Function of Ignition–Induced Misfire*, SAE Technical Paper Series (920298), pp. 101–115.

*A Linear Catalyst Temperature Sensor for Exhaust Gase Ignition (EGI) and On Board Diagnostics of Misfire and Catalyst Efficiency*, SAE Technical Paper Series (930938), pp. 168–172.

*Air Injection to an Electrical–Heated Catalyst for Reducing Cold–Start Benzen Emissions from Gasoline Vehicles*, SAE Technical Paper Series (902115), pp. 41–53.

*Exhaust Gase Ignition (EGI) –A New Concept for Rapid Light–Off of Automotive Exhaust Catalyst*, SAE Technical Paper Series (920400).

Primary Examiner—Douglas Hart
Attorney, Agent, or Firm—Timothy M. Schaeberle; Angela N. Nwaneri

[57] ABSTRACT

An apparatus for reducing the amount of electrical power needed to attain light-off of a catalytic converter, particularly a catalytic converter for internal combustion engines. In addition to a resistance-heated catalytic converter, means are provided for varying the air/fuel ratio in the exhaust gas system for the purpose of reducing the ignition temperature of the exhaust gas stream, thereby further reducing the electrical energy required to attain light-off during cold-start.

29 Claims, 2 Drawing Sheets

GAS-ENRICHED LIGHT-OFF

BACKGROUND OF THE INVENTION

This invention relates to an emission control apparatus for achieving quick light-off of exhaust gases found in applications involving automotive catalytic converters, diesel particulate filters, industrial stacks, wood stoves and other applications in which the initial temperature of the exhaust gas stream is too low to initiate fast light-off of the catalyst. In particular, the invention relates to an apparatus for reducing the time, and the amount of electrical energy required to attain catalytic light-off of a cellular honeycomb structure when such structure is used as a catalytic converter for internal combustion engines.

The Federal Test Procedure (FTP) is an emission certification test used on light-duty vehicles. Cold-start under FTP standards is the starting of an engine after a period of 12 to 36 hours of non-operation in a temperature environment of 20°–30° C. For most cold-starts, there is a time span of one to two minutes between the time the emissions begin, that is, cold start, to the time the substrate heats up sufficiently for catalyst "light-off" to occur. It is estimated that about 50% of the pollutants escaping into the atmosphere from a vehicle equipped with a catalytic converter is generated in these first two minutes following cold start-up. Light-off time is the time it takes to achieve a 50 percent conversion efficiency. The temperature at which about 50% of the pollutants have been converted to harmless gases is the light-off temperature. For most emission control systems, the light-off temperature is generally in the range of about 150° to 220° C. for fresh (unaged catalyst), to about 230° to 380° C. for aged catalysts. By reducing the light-off time, the amount of pollutants escaping into the atmosphere can be reduced.

Pollutants from automotive exhaust systems continue to present a substantial environmental challenge. Catalytic converters have been successful in reducing automotive exhaust pollution. However, as pollution standards become more stringent, there continues to be an increasing need for better and improved converters, particularly during cold-start. When a catalytic structure is heated to a sufficiently high temperature, the pollutants are catalytically reacted to produce harmless gases.

Numerous schemes have been proposed to provide faster light-off and thereby reduce the amount of pollutants discharged into the atmosphere during cold-start. Mainly, it has been suggested to heat the entire catalytic converter or to heat the inlet gas stream in order to bring the substrate to its light-off temperature faster. Such heating methods are inefficient and require considerable amounts of energy. According to one of these modifications, a metal heater is disposed in the exhaust gas passage ahead of the catalytic converter. The heater first heats up the exhaust gas which then heats up the catalytic converter. The problem with this method is that a substantial amount of electric power is required to raise the metal substrate to a temperature high enough to heat all of the incoming exhaust gases. Recently, it has been suggested to preheat a cellular structure for the purpose of achieving early light-off by forming a resistance heater directly onto the surface of a catalytic structure and providing means for activating the surface by passage of electrical current or other heating means for the purpose of heating the structure.

An engine exhaust system has also been suggested in which a by-pass duct is connected in parallel with the catalytic converter to form a closed recirculation loop around the converter. Within the by-pass duct there are arranged, a fan and a heater which operate to draw air downstream of the converter into the duct to be heated and returned to a region upstream of the converter.

More recently, it has been suggested to introduce a metered volume of comminuted water-soluble, oxygen-containing organic compound such as alcohol, aldehyde, ketone and ether, into a $NO_x$-containing gas in the presence of excess oxygen prior to exposure to a copper-containing ZSM5 zeolite.

It has also been suggested to inject a mixture of fuel and air into the exhaust stream so that the exhaust stream runs rich, and to then ignite the mixture, using a spark plug, before the gas reaches the catalytic reactor. In this system, the air is supplied by an electric pump. While this system reduces the high energy (battery drain) problems associated with the metal heaters discussed above, it requires a high concentration of combustible gas, injector, and air pump for proper operation. More significantly, there is a risk of overheating the catalytic reactor which could cause the catalyst to degrade or cause the substrate to melt or deform.

There continues to be the need to provide more efficient cold-start exhaust systems. Accordingly, it is the object of the present invention to reduce the electrical energy needed to produce quick light-off of catalytic reactors.

SUMMARY OF THE INVENTION

Briefly, the present invention provides an apparatus for reducing the time, and the amount of electrical energy needed to attain light-off of catalytic converters in which, in addition to a resistance-heated catalytic converter, means are provided for producing a large amount of exothermic energy while varying the air/fuel ratio in the exhaust gas system. In a broad aspect, the invention provides an engine exhaust gas apparatus comprising:

housing having an inlet and outlet end;

exhaust pipe connected to the inlet end and connecting the housing to the engine;

tail pipe connected to the outlet end;

catalytic converter disposed in the housing;

means for introducing fuel and air into the apparatus to form a air/fuel mixture; and means for increasing the available chemical energy per unit volume of the fuel:air mixture.

In one other aspect, the major objective of the system (i.e., to reduce the time, and the electrical energy needed to attain light-off) is accomplished by using an exothermic gas to increase or augment the exothermic energy of the standard fuel of the system, and therefore reduce, the amount of electrical energy and time required to attain light-off.

In another aspect of the invention, the time and electrical energy is further reduced by using organic compounds which catalytically burn at low temperatures (e.g., lower ignition gas having a lower light-off temperature than the standard fuel of the engine), thereby further reducing the time required to attain light-off.

In one specific aspect, the present invention provides an exhaust gas apparatus which includes (1) a housing having an inlet and outlet end, (2) an exhaust pipe connected to the inlet end and connecting the housing to the engine for passing exhaust gas from the engine to the housing, (3) a tail pipe connected to the outlet end for discharging treated exhaust into the atmosphere, (4) catalytic converter disposed in the housing, (5) means for introducing fuel and air into the apparatus to form a air/fuel mixture; and (6) means for increasing the available chemical energy per unit volume of the fuel:air mixture. Optionally, the apparatus may include means for controlling the air/fuel ratio at near stoichiometric ratio, and means for injecting fuel into the exhaust gas in the region between the engine and the catalytic converter to form a air/fuel mixture.

In another aspect, the catalytic converter functions as both a catalyst and as an ignitor to heat the air/fuel mixture. Preferably, the catalytic converter is a cellular substrate having inlet and outlet end faces, and a matrix of cell walls defining a plurality of cells or passageways extending longitudinally and mutually parallel therethrough between the inlet and outlet end faces. In this aspect, a layer of electrically conductive material is formed on the cell walls on the inlet end portion of the substrate such that the layer of conductive material is an integral part of the substrate. In addition, the converter includes means for activating the electrically conductive material to heat the substrate.

In still another aspect, the means for heating the electrically conductive material consist of electrodes which can be either fixedly or detachably connected to the conductive material.

In a further aspect, more than one catalytic converter is disposed within the housing. In this aspect, the converters can be catalyzed with the same or different catalysts.

In one exemplary embodiment, the present invention provides a method of purifying an engine exhaust gas stream by:

(a) providing an apparatus comprising a housing having an inlet and outlet end, exhaust pipe connected to the inlet end and connecting the housing to the engine, tail pipe connected to the outlet end, catalytic converter disposed in the housing, means for igniting the air/fuel mixture; and means for introducing fuel and air into the apparatus to form a air/fuel mixture;

(b) applying sufficient energy to the igniting means to attain conversion temperature of the air/fuel mixture;

(c) introducing excess air/fuel mixture into the exhaust pipe until the temperature of the igniting means is sufficiently high to convert the exhaust gases; and (d) starting the engine.

As used in the present specification:

"fuel misfire" is used to describe the result obtained when signals in an exhaust gas apparatus are temporarily interrupted to cut off fuel to a cylinder as described by Clifford D. Tyree in Emission Levels and Catalyst Temperature as a Function of Ignition-Induced Misfire, SAE Technical Paper Series No. 920298 (1992) (reprinted from: Fuel Systems and General Emissions (SP-910));

"engine misfire" or "ignition-induced misfire" is misfire accomplished by suppressing the signal to the ignition control module to obtain a specific misfire rate; for example, in a six cylinder engine, if one cylinder is disabled (that is 1/6th of the cylinders are disabled), there would be a 16.667 percent misfire rate; engine misfire can be either due to spark plug misfire (i.e., by interrupting electrical impulse to one or more spark plugs), or fuel injector misfire (i.e., by disrupting the flow of fuel to one or more fuel injectors); during a spark plug misfire, the exothermic exhaust gas is the original fuel gas of the engine which, during the misfire, passes through the engine unburned; and during a fuel injector misfire, the exothermic exhaust gas is the ignited (burned) fuel from the engine;

"ignition" refers to catalytic combustion or exothermic catalytic reaction or catalytically induced reaction;

"ignitor" refers to the means used to induce the ignition;

"heater" or "preheater" refers to any catalytically active, electrically conductive structure having open passages to allow exhaust gas to flow through, such as metal or ceramic mesh, cellular structures such as a honeycomb, and open cell sponge type structures; while the heater can be an ignitor, the ignitor is not necessarily a heater. The preheater serves a dual function. It can act as an ignitor to catalytically initiate an exothermic reaction of the combustible gas in the exhaust stream. It can also provide heat from electrical energy supplied by the battery.

DETAILED DESCRIPTION OF THE INVENTION

Figure 1:
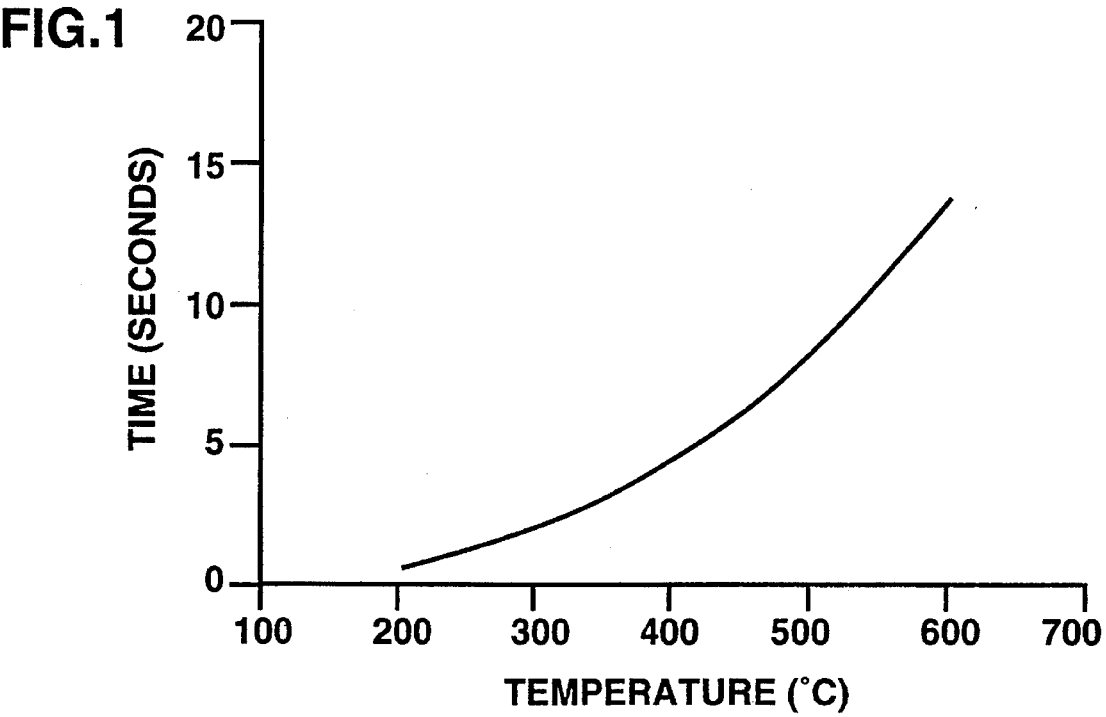
FIG. 1, is an exemplary diagram showing the time required to heat a preheater or ignite to a given temperature using a constant voltage source.

The exhaust gas apparatus of the invention operates to significantly reduce the amount of pollutants discharged into the atmosphere during cold-start without exerting large electrical drain on the electrical energy source, e.g., a battery. This is accomplished by augmenting the exothermic energy of the gas mixture in the exhaust stream and igniting the mixture.

Applicants have discovered that a hybrid system using an electrically heated catalyst in combination with a system that provides appropriate air/fuel mixture could be used to reduce the electrical power needed to raise the catalyst to its operating temperature. Preferably, the exhaust air/fuel mixture can be catalytically oxidized at a lower temperature than that needed to oxidize the normal exhaust of the particular engine or exhaust system. More preferably, the fuel is a light (short carbon) fuel such as isopropanol, methanol, butanol and ethanol, more preferably methanol.

It will be recognized that because of differences in catalytic converters, engine operating conditions, etc., the ignition temperature of the low igniting fuel may vary. In general, the low ignition fuel should ignite at a temperature lower than the ignition temperature of the standard fuel of the system, preferably, at a temperature in the range of about 50° and 300° C., most preferably below 200° C. For example, under controlled conditions and using methanol, a preferred fuel of the invention, conversion temperature of the methanol in the differential scanning calorimeter (DSC) was attained at below 60° C. The ignition temperatures of some useful fuels under controlled conditions are given in FIG. 2.

The exothermic air/fuel mixture can be created by various methods such as by generating a misfire in the engine by use of spark plugs for example, by generating a misfire in the fuel injector using appropriate sensors and control loops, or the apparatus may include means for creating a pulsed rich/lean mixture to generate stoichiometric oxygen/fuel mixture in the engine. Alternatively, the exotherm can be created by injecting a rich fuel mixture into the exhaust gas stream from a fuel source, and igniting the mixture. If a rich fuel mixture is injected into the system, then it may be desirable to include an air pump for the purpose of controlling the air/fuel ratio of the mixture.

The total amount of heat supplied (i.e., the heat produced by the exothermic gas, and the energy supplied by the heater), should be sufficient to keep the catalytic converter above light-off temperature, but not so much as to overheat the converter and destroy the catalyst, melt or destroy the substrate. When a combustible gas mixture is introduced into the exhaust gas stream, in the region just upstream from the catalytic converter, it ignites at the heater or ignitor to produce heat due to the resulting exothermic reaction. We have found that if the proper type and amount of fuel is introduced into the gas stream, the resulting exotherm can be used to preheat the catalytic reactor during cold-start.

Several methods can be employed to introduce combustible gas into the exhaust gas stream. One such method is to program a computer model to control the ignition of the engine to cause a misfire. The number and duration of the misfire would be controlled until sufficient amount of the combustible gas is produced to provide the energy necessary to heat the reactor. Where the misfire is generated in the engine (for example, by misfiring the spark plugs), the misfire could be distributed among the cylinders or only one cylinder could be misfired (for example, the cylinder closest to the exhaust system), so that combustible gas reaches the converter in a short period of time. Another method of introducing the combustible gas is to inject the gas into the exhaust system between the engine and the catalytic converter (i.e., within the exhaust pipe). This can be done either mechanically (for example, using a timer), or by using a computer model as described herein. Where the engine is equipped with fuel injectors (including the appropriate sensors and feed-back systems), we have also found that the combustible exothermic gas can be introduced by electrically turning off the injectors to cause a programmed fuel injector misfire. With proper feedback loop and sensors, the air/fuel ratio can be regulated to produce sufficient amounts of combustible gas to provide the necessary exothermic energy to heat the catalytic converter. Any one of the above methods (i.e., spark plug misfire, fuel misfire, and rich/lean mixtures), can be used either independently or in combination with another method to rapidly heat the catalytic converter.

The combustible gas is then ignited by use of an appropriate ignitor such as an electric preheater as described elsewhere below. The thermal energy needed to preheat the converter does not need to be supplied by the combustible gas alone. In addition to being an ignitor, the preheater could also act as a heater to supply electric energy to supplement the energy from the combustible gas. The ignitor can be a conductive cellular metal preheater or a non-conductive structure (such as a ceramic honeycomb structure), on which a layer of electrically conductive material has been applied. Using the feedback loop described below, the electric power for heating the converter can be reduced as the energy produced from the exothermic gas increases.

In one particularly useful embodiment, the ignitor can be a cellular substrate which can be either electrically conductive or electrically insulating (preferably electrically insulating such as a cellular ceramic structure), on which a layer of electrically conductive material has been formed on at least a portion thereof as described in co-assigned, co-pending U.S. patent application Ser. No. 07/893,256 which is hereby incorporated by reference. Where the substrate is made of electrically conductive material (such as metal), it may be necessary to form a non-conducting passivating layer on the substrate prior to application of the electrically conducting layer. The passivating layer can be formed by applying a layer of metal oxide on the substrate. The same objective can be achieved by applying a self-passivating metal to the substrate. Generally, metals used in high temperature environments develop a non-electrically conducting passivating oxide layer which allows these metals to withstand repeated use at very high temperatures. Therefore, the passivating layer can be achieved by applying a layer of appropriate high temperature metal (a self-passivating metal which will form the oxide layer) to the substrate. An electrically conductive layer is then formed over the passivating layer to better control or regulate the conductance of the metal catalytic structure. In such applications, to avoid thermal shock or distortion which may result due to mismatch of thermal expansion, the conductive layer can be formed of the same material as the conductive substrate. For example, both the substrate and the conductive layer can be selected from high temperature metals and alloys such as iron-chrome-aluminum and nickel-chrome alloys. The substrate can be formed by extruding powders of the alloys or by forming crimped and wrapped cellular structures with the metals and/or alloys, or by using a wire mesh or sponge metal having through cells or passageways.

The catalytic converter can be catalyzed with appropriate catalysts for the conversion of hydrocarbons, carbon monoxide, and oxides of nitrogen. Any of the conventional methods used for catalyzing substrates may be used. Preferably, the catalysts are applied in the form of a washcoat over a cellular substrate such as a honeycomb substrate. In this embodiment, the washcoat can be applied either before or after (preferably after), the electrically conductive layer is applied over the substrate.

Figure 3:
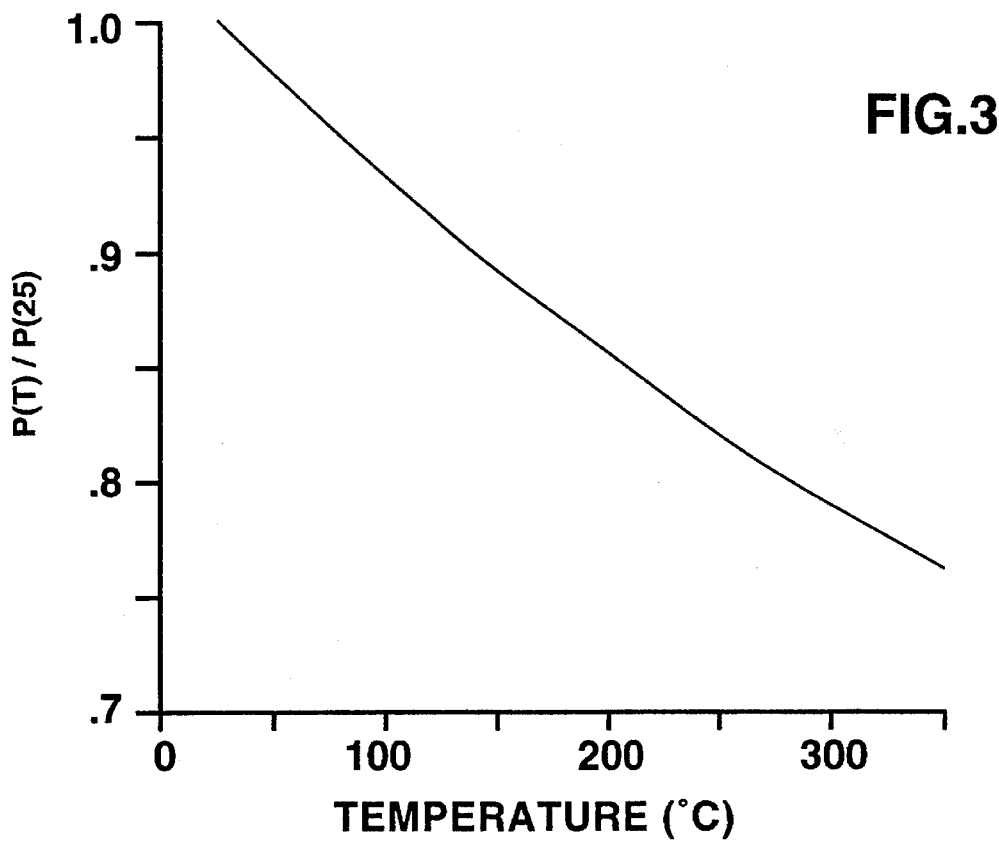
FIG. 3, is a graph showing power input as a function of temperature, at a constant voltage.

An important object of the present invention is to rapidly ignite the combustible gas. FIG. 1 is an exemplary plot of the time required to heat a preheater or ignitor to a given temperature using a constant voltage source to supply about 5.6 volts of applied voltage. In this example, the preheater is a ceramic substrate having about 4 micron thick layer of Pt/Rh alloy applied to the surface. According to the invention, if a combustible gas is used which can be ignited at a lower temperature, this would reduce the amount of time and electrical energy needed to heat the preheater. The catalytic reaction of the low ignition gas occurs at a lower temperature than that of the exhaust gas. After the light-off temperature of the low ignition gas is attained, it is necessary to continue to feed or supply low ignition fuel until the light-off temperature of the exhaust gas is attained. Once the light-off temperature of the exhaust gas is attained, the supply of low ignition fuel is easily shut-off or terminated to prevent overheating. Using the control loop of this system, it is easier to control heating and prevent catalytic degradation which may result from overheating. In addition to the obvious advantage of reducing light-off time and power consumption, lower gas ignition temperatures also provide other useful advantages in engine emission control systems. When a thin layer of conductive material such as noble metals, preferably, platinum, rhodium, palladium and alloy of these, most preferably, platinum, is formed on the surface of a cellular substrate and connected to a battery, the electrical resistance of the device increases as the temperature increases. Thus, at constant voltage, as the device temperature increases, the power input decreases. This is illustrated by FIG. 3 which provides an estimate of power input as a function of temperature at a constant voltage. FIG.

3 shows the ratio of the power consumption at temperature, T, compared to that consumption at 25° C., versus the device temperature, using the data of Sample 1 which is described below, and assuming constant voltage source. We have found that when platinum is mixed with rhodium, the positive temperature coefficient of the material is reduced. Therefore, if platinum/rhodium alloy is used, it is desirable to keep the rhodium content at a level of about 20% or less, preferably less than 10%, most preferably less than 5%. The closer the rhodium content approaches zero (that is, the closer the material approaches pure platinum), the higher the positive temperature coefficient, and the more useful the material is for the practice of the invention.

The heating rate of a catalytic converter is reduced at higher temperatures due to radiant energy loss. Another advantage of lower ignition temperature is that less electrical energy is needed to replace heat loss by radiation. A cellular ceramic substrate has high emissivity from the ends due to its shape which approximates a black body cavity. Since the rate of emittance is proportional to the fourth power of the absolute temperature, the radiation losses for a cellular ceramic device at 170° C. are about half the measured losses for the same device at 253° C.

Figure 2:
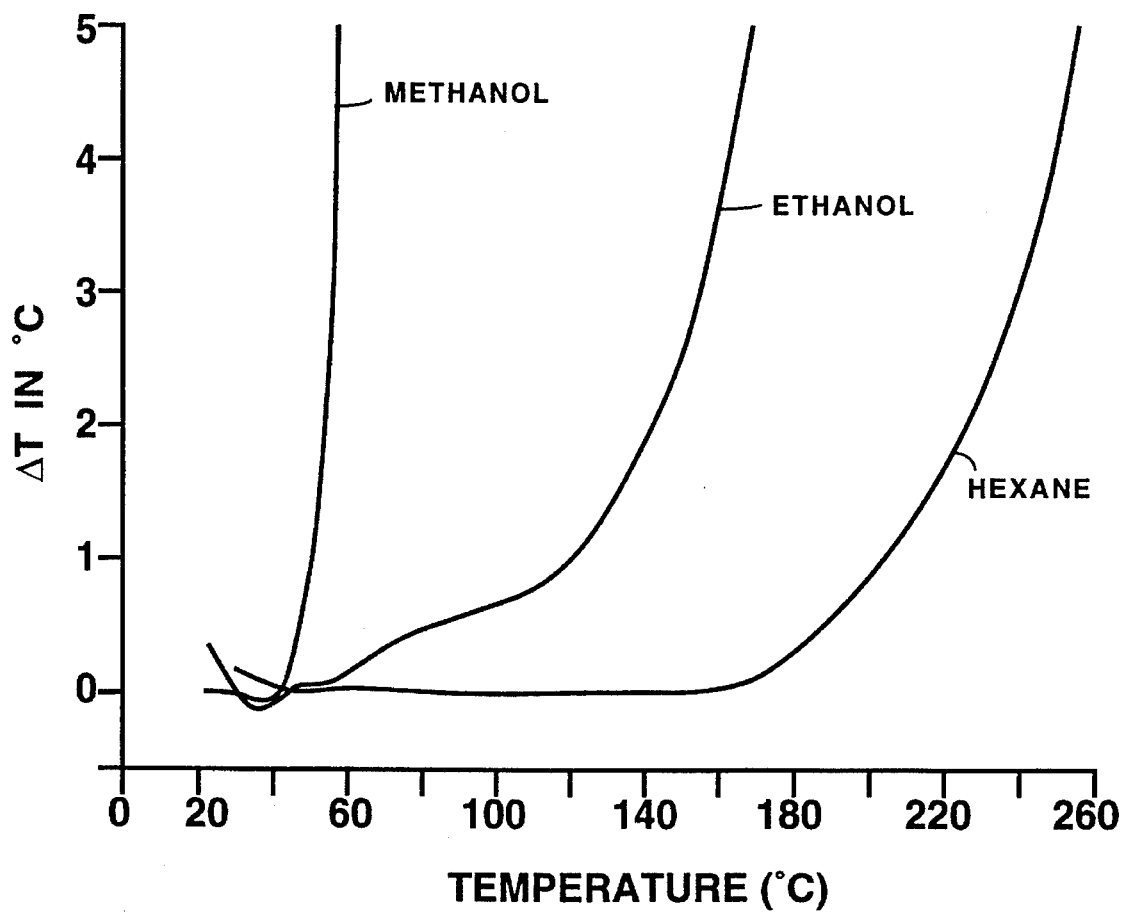
FIG. 2, is a differential scanning calorimetric diagram showing the exotherm obtained from catalytically reacting three different of fragments of a catalyzed cellular substrate.

FIG. 2 is a DSC plot showing the exotherm obtained from catalytically reacting three different gases on fragments of a catalyzed cellular substrate. The fuel-air mixtures were made by passing air through the liquid fuel using a fritted glass bubbling jar apparatus. The liquid temperature was about 20° C., the heating rate was about 20° C./min, and the differential temperature sensitivity was 50 mv/cm. FIG. 2 compares the results obtained from methanol, ethanol and hexane (representing a chain hydrocarbon in gasoline). The ethanol was a 95/5 ethanol/isopropanol blend. Initial catalytic conversion was observed at about 45° C. for methanol, 50°–60° C. for ethanol, and about 160° to 170° C. for hexane. By reducing the ignition temperature of the exothermic fuel gas, the amount of electrical energy required to attain light-off can be significantly reduced. Any low igniting fuel such as methanol which ignites on an automotive catalyst at significantly lower temperatures than long chain fuels (similar to the gas line), may be used as the ignition fuel, or at least a portion of the ignition fuel to achieve the object of the invention. Alternatively, in a system having a preheater, a separate container could be used to store the low ignition fuel (e.g., methanol), for injection into the exhaust stream upstream from the converter, just after, or as the preheater reaches the fuel combustion temperature. As previously described, the injection may be programmed or sequenced to occur before or during the initial start-up of the engine.

The low temperature ignition fuel could supply all of the heat needed to preheat the reactor to a high enough temperature to catalytically react with the engine exhaust gases. Alternatively, the heat supplied by the combustible gas could be supplemented with exothermic gases produced from the engine by using controlled spark plug and/or fuel injector misfire. Also, the above energy sources could be supplemented with electrical energy to the ignitor/preheater.

In one set of experiments, the exhaust gas apparatus of the invention was tested using three different cellular samples. The samples were small and consisted of two ceramic substrates (Samples 1 and 2), and one metal monolith (Sample 3). For Sample 1, an intermediate layer of a glass ceramic composition was applied to the substrate surface to provide a smooth surface for the application of conductive material. For Sample 2, the intermediate layer consisted of Kocite COR-30, a precordierite powder available from Union Carbide. After the intermediate layers were applied, nominal 1.5 micron-thick coatings of Pt/Rh (about 12% Rh), were sputtered on one end portion of the ceramic substrates. Voltage probes (electrical leads or electrodes) were then spaced about 3–4 cm apart on the Pt/Rh-coated surface of the ceramic samples, and on one portion of the metal monolith and connected to an electrical voltage source.

Resistance measurements were made using a resistance bridge by connecting wires to the samples in a standard four terminal configuration. The samples were then placed in a small lab furnace where resistance measurements were taken at about 50° C. intervals during the heating and cooling cycles. Temperature measurements were taken using a thermocouple located near the samples.

Figure 4:
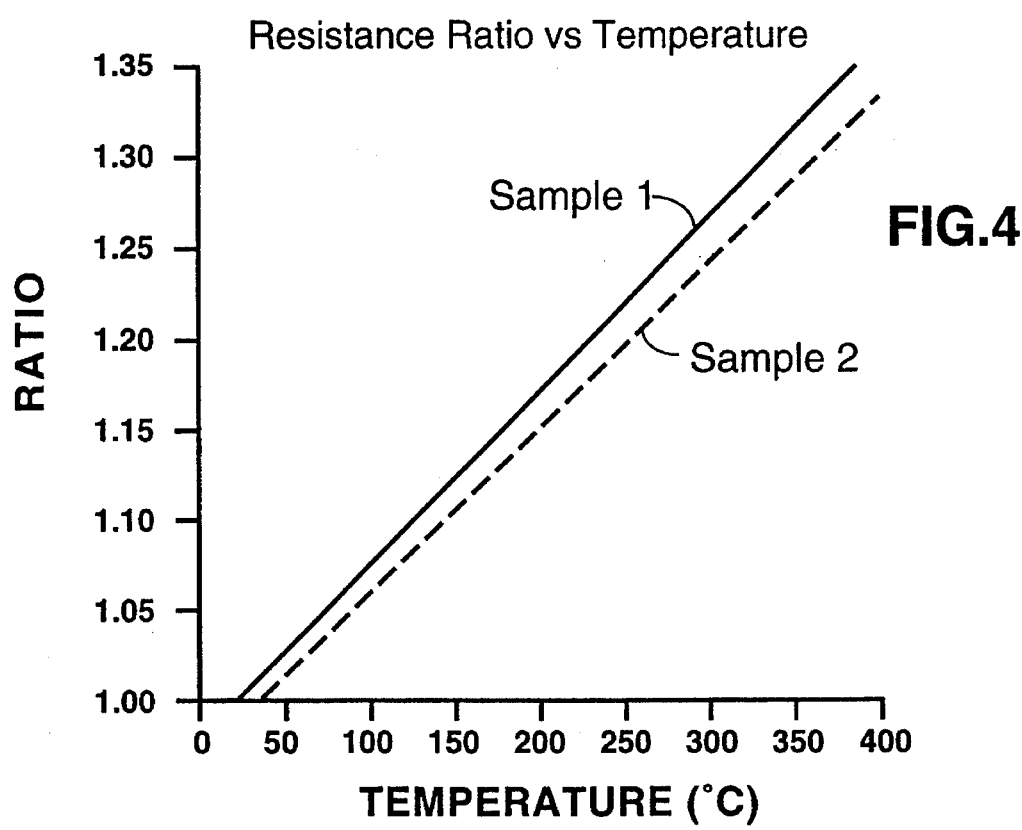
FIG. 4, is a graph showing the change in resistance with temperature for two samples.

FIG. 4, shows the change in resistance with temperature for Samples 1 and 2 plotted as the ratio of the resistance at a given temperature to the resistance at room temperature. As shown, the temperature coefficient of resistance (measured by the slope) of both samples, is comparable. Actual measured resistances for Samples 1–3 are given in Table 1 below:

TABLE 1

| Temperature (°C.) | Resistance (ohms) | Resistance Ratio |
| --- | --- | --- |
| Sample 1 | | |
| 24 | 2.42 | 1.00 |
| 84 | 2.57 | 1.06 |
| 128 | 2.66 | 1.10 |
| 186 | 2.79 | 1.15 |
| 243 | 2.92 | 1.20 |
| 302 | 3.04 | 1.25 |
| 352 | 3.20 | 1.32 |
| Sample 2 | | |
| 24 | 4.09 | 1.00 |
| 81 | 4.28 | 1.05 |
| 133 | 4.42 | 1.08 |
| 182 | 4.60 | 1.12 |
| 241 | 4.84 | 1.18 |
| 302 | 5.13 | 1.26 |
| Sample 3 | | |
| 24 | .0087 | 1.00 |
| 126 | .0088 | 1.01 |
| 199 | .0089 | 1.02 |
| 300 | .0090 | 1.03 |
| 400 | .0091 | 1.04 |

As shown, the temperature coefficient of resistance for the extruded metal monolith is lower than that of the noble metal-coated ceramic substrates by about an order of magnitude.

The positive temperature coefficient (i.e., increase in electrical resistance with increasing temperature) of FIG. 4, provides a useful means for controlling the amount of electrical energy needed to achieve catalytic conversion. Since the resistance is linearly related to the temperature, standard bridge circuitry can be used to feed back data to a control system for the purpose of regulating electrical energy. The same information can also be used to control or regulate the flow of an alternative fuel during engine start-up. Another advantage of the positive temperature coefficient of resistance is that for a given applied voltage, the electrical power input decreases as the device temperature increases. This allows the heater to serve a self-limiting function and provide better temperature control. The positive temperature coefficient of resistance also helps to reduce the severity of "hot spots" which may occur due to non-uniform resistance in some parts of the heater.

The main objectives for any control system useful for the invention are to increase the catalyst temperature to a level sufficient to convert exhaust gas pollutants, while minimizing the amount of electrical energy needed to reach such desired temperature. It is also desirable to minimize the consumption of air/fuel additives that may be added to the exhaust gas stream. One useful control mechanism contemplated by the invention includes the following sequence: (1) provide an apparatus having a housing with an inlet and outlet end, an exhaust pipe connected to the inlet end and connecting the housing to the engine for passing exhaust gas from the engine to the housing, a tail pipe connected to the outlet end for discharging treated exhaust into the atmosphere, an electrically heated catalytic converter (heater) disposed in the housing, and source for introducing methanol (such as a methanol injector) and air (such as an air pump) into the apparatus to form a methanol/air mixture; (2) warm the heater to a temperature sufficient to achieve complete conversion of the methanol/air mixture; (3) turn on the methanol generator or injector to introduce methanol/air mixture into the exhaust pipe; (4) when the heater temperature indicates that heating by chemical exothermic reaction will sustain the temperature, shut off or reduce the electrical power to the heater; (5) continue to maintain and/or control the flow of methanol to ensure that sufficient temperature is attained (and maintained) for complete conversion of exhaust gas pollutants; when such temperature is attained, start the engine. Alternatively, the engine can be started either before or as the conversion temperature is attained. Since pollutants may be discharged into the atmosphere if the conversion temperature has not been attained, in the preferred embodiment, the engine is started after such temperature is attained. Using this model, the methanol injector will be shut off when the heat supplied by the exhaust gas is sufficient to maintain the temperature for complete conversion.

In another control mechanism, either before, during, or after the engine is started, the fuel content of the exhaust gas stream is enriched using any known technique, at the same time, supplying sufficient air (if needed), to attain chemical stoichiometry. The right stoichiometry may be attained by injecting fuel into the exhaust gas stream, using the air present in the exhaust line. If there is insufficient air in the line, air may be added using an external supply means such as an air pump. The resistance measurement techniques discussed above, as well as a thermocouple, or timer may then be used to control both the gas enrichment process and the heater temperature. In this embodiment, using appropriate sensors and control loop, electrical power supply to the heater and/or the flow of fuel, is decreased or shut off when conversion temperature is achieved and is determined to be self-sustaining.

It should be understood that the foregoing represent illustrative embodiments of the invention, and are not intended to embody all aspects of the invention. In addition to the above embodiments, it will be clear to persons skilled in the art that numerous modifications and changes can be made to the above embodiments without departing from the intended spirit and scope of the invention.

We claim:

1. A method of purifying an engine exhaust gas stream by:
   (a) providing an apparatus comprising a housing having an inlet and outlet end, exhaust pipe connected to the inlet end and connecting the housing to the engine, tail pipe connected to the outlet end, source for introducing fuel and air into the apparatus to form a air/fuel mixture and an electrically heated catalytic converter disposed in the housing for igniting the air/fuel mixture;
   (b) applying sufficient energy to the electrically heated catalyst to attain the conversion temperature or ignition of the air/fuel mixture;
   (c) introducing the air/fuel mixture into the exhaust pipe until the temperature of the catalytic converter is sufficiently high to convert the exhaust gases; and
   (d) starting the engine.

2. The method of claim 1 wherein the fuel exhibits an ignition temperature within the range of 50° to 300° C.

3. The method of claim 2, wherein the ignition temperature of the fuel is not greater than 200° C.

4. The method of claim 2, wherein the fuel is selected from methanol, ethanol and propanol.

5. The method of claim 1, wherein the fuel is methanol.

6. The method of claim 1, wherein the electrically heated catalytic converter comprises a cellular substrate having inlet and outlet end faces, and a matrix of cell walls defining a plurality of cells or passageways extending longitudinally and mutually parallel therethrough between the inlet and outlet end faces.

7. The method of claim 5, wherein the electrically heated catalytic converter further comprises a layer of electrically conductive material formed on the cell walls on the inlet end portion of the cellular substrate such that the layer of conductive material is an integral part of the substrate; and means, connected to the conductive material, for heating the converter.

8. The method of claim 6, wherein the electrically heated catalytic converter further comprises a catalytically active washcoat.

9. The method of claim 7, wherein the electrically heated catalytic converter further comprises an electrically conductive material having formed thereon, a layer of non-conductive passivating material.

10. The method of claim 6, wherein the heating of the electrically heated catalyst is achieved through the attachment of electrical leads to the catalyst.

11. The method of claim 8, wherein the electrically conductive material is made of material selected from iron-chrome-aluminum alloys, and nickel-chrome alloys.

12. The method of claim 1, wherein the engine is started before step (c).

13. The method of claim 1, wherein the engine is started before step (b).

14. A method of purifying an engine exhaust gas stream containing pollutants by:
   (a) providing an apparatus comprising a housing having an inlet and outlet end, exhaust pipe connected to the inlet end and connecting the housing to the for passing the exhaust gas from the engine to the housing, tail pipe connected to the outlet end for discharging treated exhaust gas into the atmosphere, and an electrically heated catalytic converter disposed in the housing,
   (b) electrically heating the catalytic converter to a temperature sufficient to achieve ignition of a fuel/air mixture;
   (c) introducing a low temperature injection fuel and air into the apparatus, upstream from the housing, to form the fuel/air mixture;
   (d) causing the fuel air mixture to flow into the catalytic converter resulting in the ignition or exothermic reaction of the fuel/air mixture and a subsequent chemical heating of the catalytic converter;
   (e) continuing to electrically heat the catalytic converter until the fuel/air mixture exothermic reaction is able to chemically maintain the temperature sufficient to achieve ignition of the fuel/air mixture and thereafter reducing the electrical heating of the catalytic converter;

(f) continuing to introduce and flow the fuel/air mixture until the catalytic converter has reached, and can be sustained by the exhaust gas stream, at temperature sufficient to achieve a complete conversion the exhaust gas pollutants in the exhaust gas stream;

(g) starting the engine.

15. The method of claim 13 wherein the fuel exhibits an ignition temperature within the range of 50° to 300° C.

16. The method of claim 13, wherein the ignition temperature of the fuel is not greater than 200° C.

17. The method of claim 13, wherein the fuel is selected from methanol, ethanol and propanol.

18. The method of claim 13, wherein the fuel is methanol.

19. The method of claim 13, wherein the electrically heated catalytic converter comprises a cellular substrate having inlet and outlet end faces, and a matrix of cell walls defining a plurality of cells or passageways extending longitudinally and mutually parallel therethrough between the inlet and outlet end faces.

20. The method of claim 18, wherein the electrically catalyst further comprises a layer of electrically conductive material formed on the cell walls on the inlet end portion of the cellular substrate such that the layer of conductive material is an integral part of the substrate.

21. The method of claim 19, wherein the electrically heated catalyst further comprises catalytically active washcoat.

22. The method of claim 20, wherein the electrically heated catalyst is comprised of electrically conductive material having formed thereon, a layer of non-conductive passivating material.

23. The method of claim 13, wherein the heating of the electrically heated catalyst is achieved through the attachment of electrical leads to the catalyst..

24. The method of claim 22, wherein the electrically conductive material is comprised of made of material selected from iron-chrome-aluminum alloys, and nickel-chrome alloys.

25. The method of claim 13, wherein the engine is started before step (f).

26. The method of claim 13, wherein the engine is started before step (e).

27. The method of claim 13, wherein the engine is started before step (d).

28. The method of claim 13, wherein the engine is started before step (c).

29. The method of claim 13, wherein the engine is started before step (b).

* * * * *